W. H. & C. L. SEMON.
NUT LOCK.
APPLICATION FILED FEB. 15, 1912.
1,066,761.
Patented July 8, 1913.
2 SHEETS—SHEET 1.
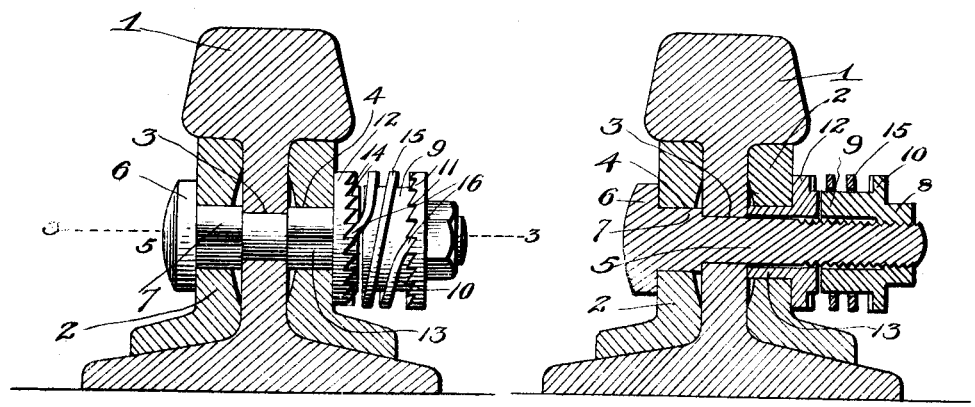
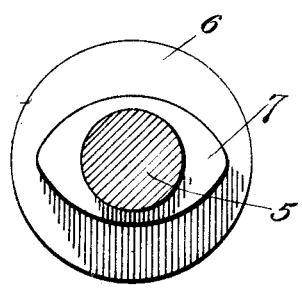
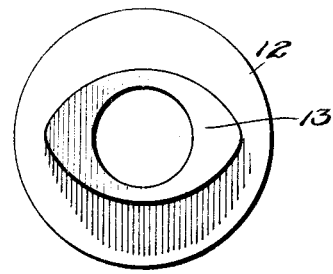
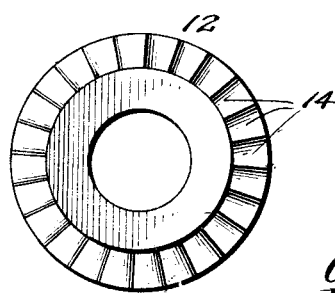
Witnesses
Inventors
Charles L. Semon
William H. Semon
Attorneys W. H. & C. L. SEMON.
NUT LOCK.
APPLICATION FILED FEB. 15, 1912.
1,066,761.
Patented July 8, 1913.
2 SHEETS—SHEET 2.
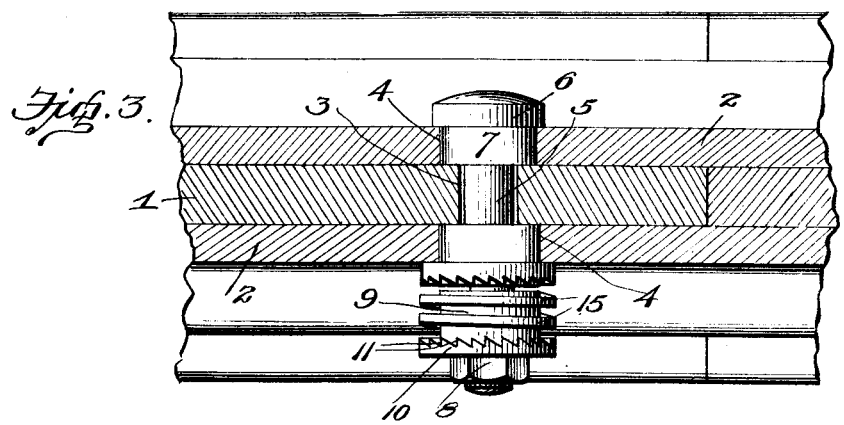
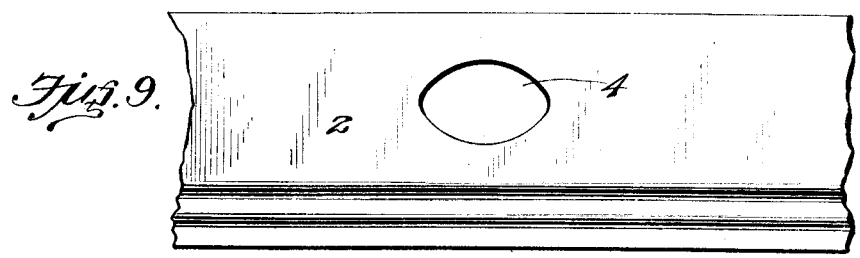
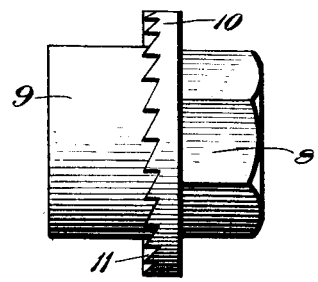
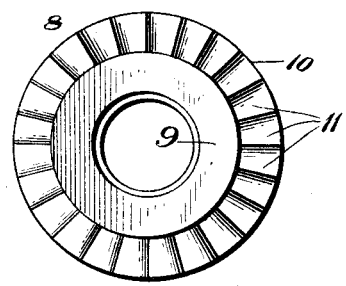
Witnesses
Inventors
Charles L. Semon
William H. Semon
by H. B. Willson & Co.
Attorneys

UNITED STATES PATENT OFFICE.

WILLIAM HENRY SEMON AND CHARLES LOUIS SEMON, OF RAVENNA, OHIO.

NUT-LOCK.

1,066,761.  Specification of Letters Patent.  Patented July 8, 1913.

Application filed February 15, 1912. Serial No. 677,791.

*To all whom it may concern:*

Be it known that we, WILLIAM H. SEMON and CHARLES L. SEMON, citizens of the United States, residing at Ravenna, in the county of Portage and State of Ohio, have invented certain new and useful Improvements in Nut-Locks; and we do declare the following to be a full, clear, and exact description of the invention, such as will enable others skilled in the art to which it appertains to make and use the same.

This invention relates to improvements in nut locks.

One object of the invention is to provide a nut lock having an improved construction and arrangement of locking mechanism whereby the nut may be effectually secured in position and prevented from becoming jarred loose or casually unscrewing from the bolt but which may be readily removed when desired by the use of a suitable tool.

Another object is to provide a nut lock which will be strong, durable and inexpensive in construction, efficient and reliable in operation and which is particularly adapted for use in connection with the fish plates of railway rails.

With these and other objects in view, the invention consists of certain novel features of construction, and the combination and arrangement of parts as will be more fully described and claimed.

In the accompanying drawings, Figure 1 is a vertical cross section through a railway rail and fish plates illustrating our improved nut lock applied thereto and showing the latter in side elevation; Fig. 2 is a similar view showing the locking mechanism and nut in section; Fig. 3 is a horizontal section taken on the line 3—3 of Fig. 1; Fig. 4 is a cross sectional view through the bolt showing an inner end view of the head thereof; Fig. 5 is an inner end view of the fish plate engaging washer; Fig. 6 is an outer end view of the same; Fig. 7 is a side view of the nut; Fig. 8 is an inner end view of the same; Fig. 9 is a side view of one of the fish plates of the rail with which the nut lock is engaged; Fig. 10 is a detail view of the tool employed for releasing the nut locking mechanism.

Referring more particularly to the drawings, 1 denotes the railway rail to which our improved nut lock is applied and 2 denotes the fish plates. The rail 1 is provided with the usual bolt holes 3 while the fish plates have formed therein elliptical shaped holes 4. Engaged with the bolt holes 3 in the rail and with the bolt hole in one of the fish plates is our bolt 5, said bolt having on one end a head comprising a cylindrical outer portion 6 and a reduced elliptical shaped inner portion 7, said elliptical shaped inner portion being engaged with the elliptical shaped hole 4 in the adjacent fish plate.

The bolt 5 has its threaded end projecting a suitable distance beyond the side of the opposite fish plate and on the projecting end of the bolt is arranged a nut 8 having on its inner end a cylindrical spring supporting extension 9 on which, adjacent to the inner end of the squared outer portion of the nut is formed, a radially projecting annular flange 10 having on its inner surface an annular series of ratchet teeth 11. Loosely mounted on the bolt adjacent to the inner end of the cylindrical extension 9 of the nut is a locking washer 12 having on its inner side a reduced elliptical shaped extension 13, which corresponds in size and shape to the elliptical hole 4 in the adjacent fish plate. By providing the head of the bolt and the washer with elliptical shaped portions which are engaged with the elliptical shaped holes in the fish plates, said bolts and washer are securely held against rotation.

On the outer side of the washer 12 is formed a series of ratchet teeth 14 which are disposed oppositely to the ratchet teeth 11 on the flange of the nut. On the cylindrical extension 9 of the nut between the toothed flange thereon and the washer is arranged a coiled nut locking spring 15, the ends of which are bent outwardly to a slight extent to form spring pawls 16 which engage the ratchet teeth on the flange of the nut and on the adjacent surface of the washer whereby when the nut is screwed up on the bolt the spring will be compressed and will thus hold the pawls 16 on the ends thereof in yielding engagement with the ratchet teeth of the flange and washer. The pressure of the spring when thus compressed by the nut will hold the pawls in sufficiently tight engagement with the ratchet teeth to prevent any possibility of the nut unscrewing or becoming loose on the bolt until the pawl at one end or the other of the spring is released from the ratchet teeth with which it is engaged. This releasing of the pawl may be accomplished by the use of any suitable tool or instrument, but we preferably employ a releasing tool 17 constructed as shown in Fig. 10 of the drawings and which is in the form of a flat plate having on one end spaced fingers 18, the ends of which are beveled or wedge shaped to permit the same to be readily forced between either end of the spring and the ratchet teeth with which the same is engaged, thus retracting or disengaging the pawl on said end of the spring from the ratchet teeth and permitting the nut to be screwed backward or off the bolt.

In screwing the nut onto the bolt it will be understood that the teeth on the flange of the nut will slip over the pawl on the adjacent end of the spring, while the pawl on the opposite end of the spring will slip over the teeth on the inner side of the washer, so that said pawls will not interfere with the screwing up of the nut. It will also be understood that the engagement of the elliptical shaped extension 13 of the washer by its engagement with the elliptical shaped hole in the adjacent fish plate will hold said washer against turning, so that the teeth on the opposite side of the washer form stops for the pawl on the adjacent end of the spring thereby holding said spring against turning, so that the pawl on the opposite end of the spring which engages the teeth on the flange of the nut will securely hold the nut against unscrewing from the bolt. It is further to be noted that the end of the extension 13 of the locking washer 12 is of sufficient length to be bindingly engaged with the rail when the spring supporting nut 8 is forced against the washer thereby compressing the spring 15 and causing the ends of the latter to simultaneously and yieldingly engage with the ratchet teeth on the faces of the washer and nut. In bindingly engaging the parts thus described the enlarged portion 7 of the bolt is simultaneously brought in clamping contact with one side of the web of the rail when the confined inner end of the extension 13 of the locking washer 12 is forced against the opposite side of the web portion of the rail, for the purpose fully described.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described our invention, what we claim is;

The combination with the web portion of a rail and oppositely disposed fish plates adjacent thereto, of a bolt freely passing through the latter, said bolt having an enlarged portion adapted for contact with one side of the web of the rail, a locking flanged washer having a projection slidingly engaged in the opening in one of said plates, and contacting with the opposite side of the web of the rail, said washer having ratchet teeth formed on its outer face, a nut adjustable upon said bolt and provided with a reduced spring supporting extension adapted for binding contact with the washer, and a spring closely encircling the extension of the nut with its opposite ends in yielding contact with the teeth on the washer and flange of the nut, whereby the spring is compressed and the parts yieldingly and positively locked in respect to one another with the projection of the washer and the enlarged portion of the bolt in contact with the rail.

In testimony whereof we have hereunto set our hands in presence of two subscribing witnesses.

WILLIAM HENRY SEMON.
CHARLES LOUIS SEMON.

Witnesses:
  ROBERT OLIVER BUCLE,
  JOHN FRANK STENGER.

---

Copies of this patent may be obtained for five cents each, by addressing the "Commissioner of Patents, Washington, D. C."